(12) United States Patent
White (10) Patent No.: US 10,493,832 B1
(45) Date of Patent: Dec. 3, 2019

(54) VEHICLE BODY PROTECTION DEVICE

(71) Applicant: Barry White, Cleveland, OH (US)

(72) Inventor: Barry White, Cleveland, OH (US)

( * ) Notice: Subject to any disclaimer, the term of this patent is extended or adjusted under 35 U.S.C. 154(b) by 99 days.

(21) Appl. No.: 15/818,875

(22) Filed: Nov. 21, 2017

(51) Int. Cl.
*B60J 11/06* (2006.01)

(52) U.S. Cl.
CPC .................................. *B60J 11/06* (2013.01)

(58) Field of Classification Search
CPC ........................................................ B60J 11/06
See application file for complete search history.

(56) References Cited

U.S. PATENT DOCUMENTS

| | | | | |
|---|---|---|---|---|
| 3,665,355 A | * | 5/1972 | Sasaki .................... | H01F 7/0215 101/389.1 |
| 4,531,560 A | | 7/1985 | Balanky | |
| 4,643,471 A | | 2/1987 | Fishback | |
| 4,750,767 A | | 6/1988 | Barnett | |
| 4,810,015 A | * | 3/1989 | McNeil .................... | B60J 11/06 150/166 |
| 5,129,695 A | * | 7/1992 | Norman, II .............. | B60J 11/06 280/770 |
| D335,271 S | | 5/1993 | Davis | |
| 5,605,369 A | * | 2/1997 | Ruiz ........................ | B60J 11/06 150/166 |
| 6,254,170 B1 | * | 7/2001 | Farmer .................... | B60J 11/06 150/166 |
| 7,090,266 B1 | | 8/2006 | Price | |
| 7,527,320 B1 | | 5/2009 | Nevill, Jr. | |
| 2004/0189042 A1 | * | 9/2004 | Jarrard ..................... | B32B 5/18 296/136.01 |
| 2007/0278804 A1 | * | 12/2007 | Shields .................. | B60J 11/025 293/128 |
| 2015/0001865 A1 | | 1/2015 | McGee, Sr. | |
| 2015/0258880 A1 | | 9/2015 | Wheeler | |

FOREIGN PATENT DOCUMENTS

GB 2344329 12/1998

* cited by examiner

*Primary Examiner* — Tri M Mai (57) ABSTRACT

The vehicle body protection device is configured for use with the door of a vehicle. The door is further defined with a window. The vehicle body protection device forms a barrier on the exterior surface of the door. The vehicle body protection device hangs from the window. The vehicle body protection device is a composite textile that absorbs and deflects the energy from impacts that would otherwise damage the door of the vehicle. The vehicle body protection device comprises a cover, a core, a fastener, a plurality of adhesive layers, and a plurality of magnets. The plurality of magnets attach to the core. The plurality of adhesive layers attach the cover to the core. The fastener attaches the cover to the window of the door.

11 Claims, 6 Drawing Sheets

VEHICLE BODY PROTECTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles in general, more specifically, an external removable protective cover adapted for a vehicle door.

SUMMARY OF INVENTION

The vehicle body protection device is configured for use with the door of a vehicle. The door is further defined with a window. The vehicle body protection device forms a barrier on the exterior surface of the door. The vehicle body protection device hangs from the window. The vehicle body protection device is a composite textile that absorbs and deflects the energy from impacts that would otherwise damage the door of the vehicle. The vehicle body protection device comprises a cover, a core, a fastener, a plurality of adhesive layers, and a plurality of magnets. The plurality of magnets attach to the core. The plurality of adhesive layers attach the cover to the core. The fastener attaches the cover to the window of the door.

These together with additional objects, features and advantages of the vehicle body protection device will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle body protection device in detail, it is to be understood that the vehicle body protection device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle body protection device.

It is therefore important that the claims be regarded as including such equivalent construction insofar as they do not depart from the spirit and scope of the vehicle body protection device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
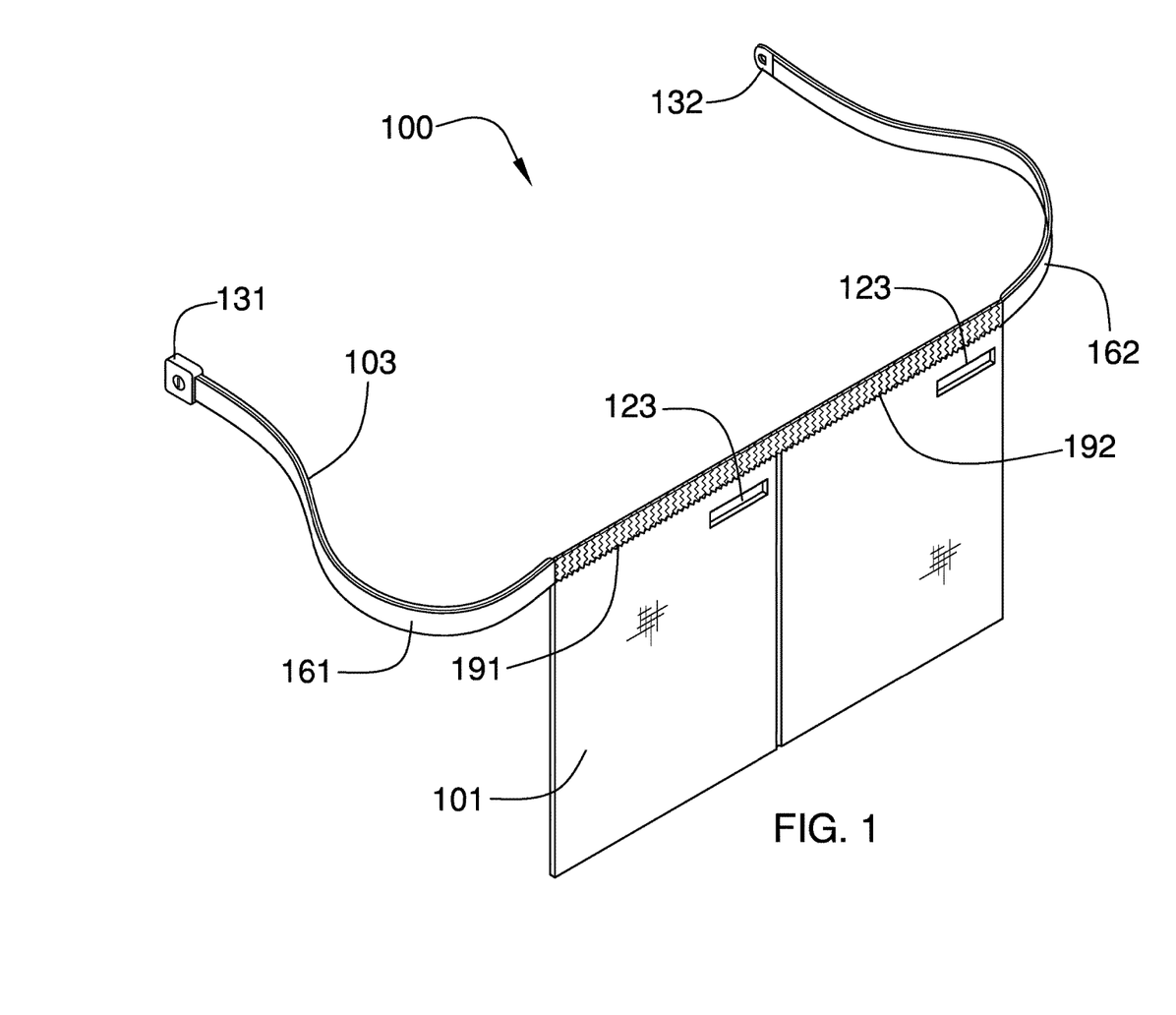
FIG. 1 is a perspective view of an embodiment of the disclosure.
Figure 2:
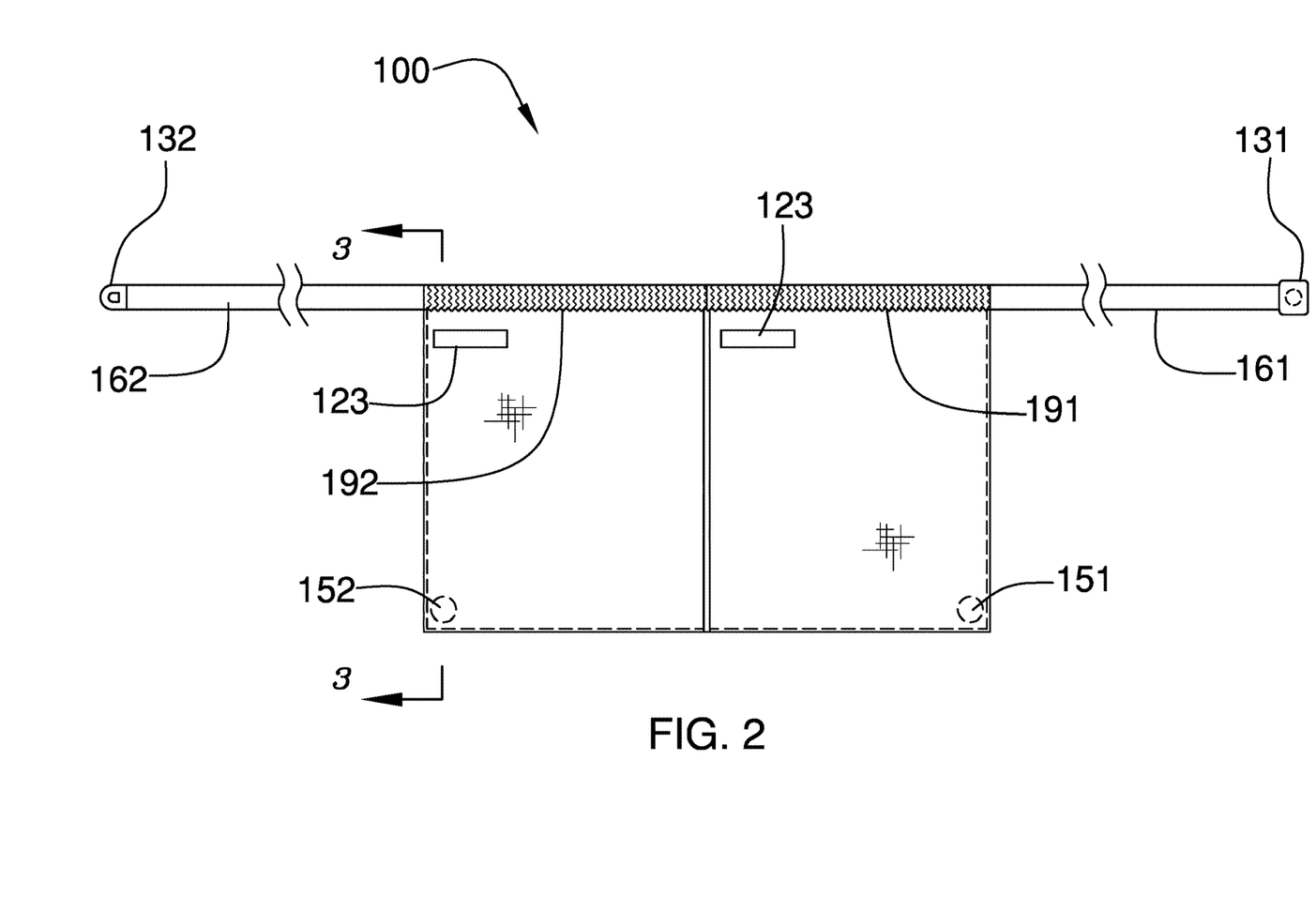
FIG. 2 is a reverse perspective view of an embodiment of the disclosure.
Figure 3:
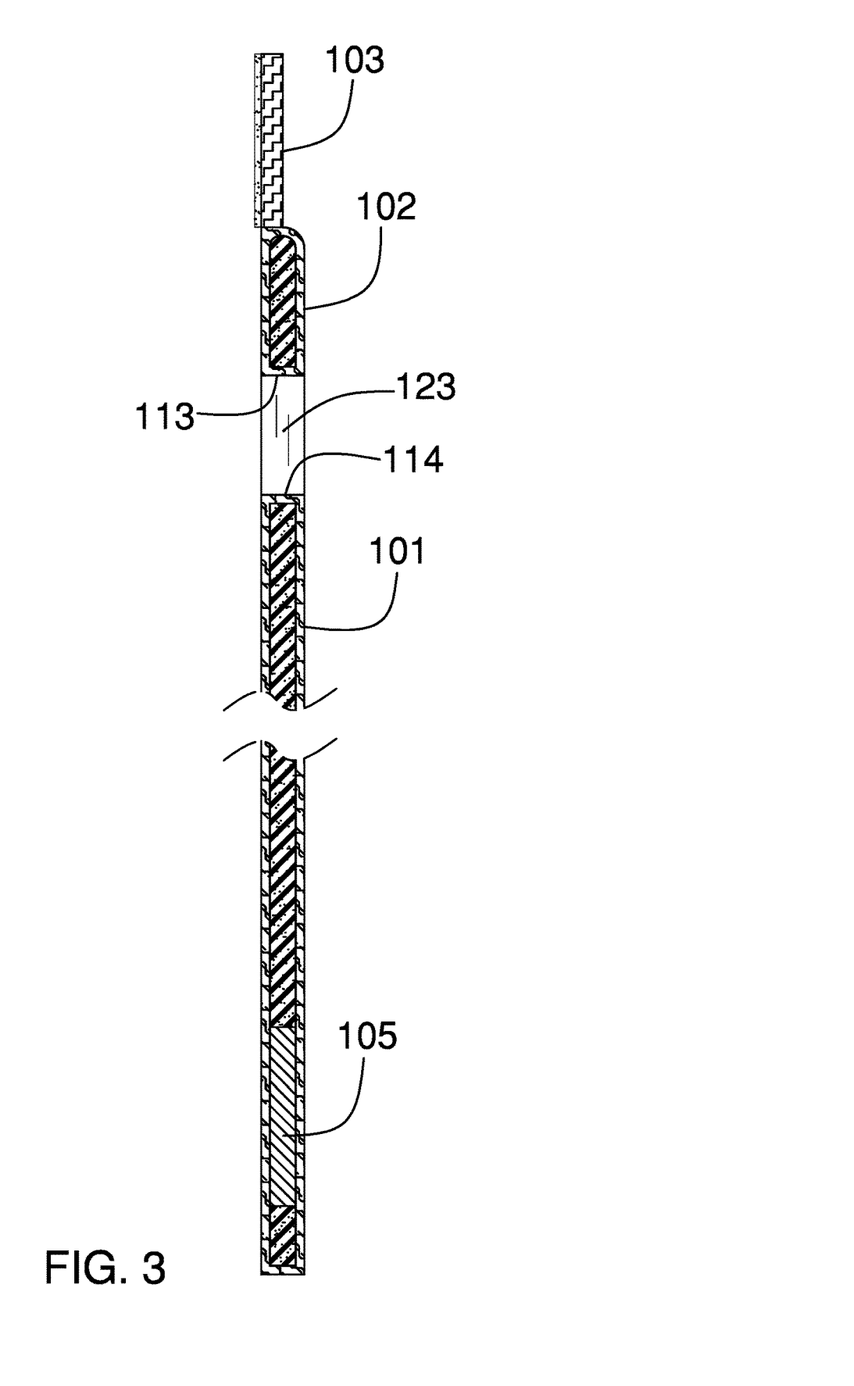
FIG. 3 is a cross-sectional view of an embodiment of the disclosure across 3-3 as shown in FIG. 2.
Figure 4:
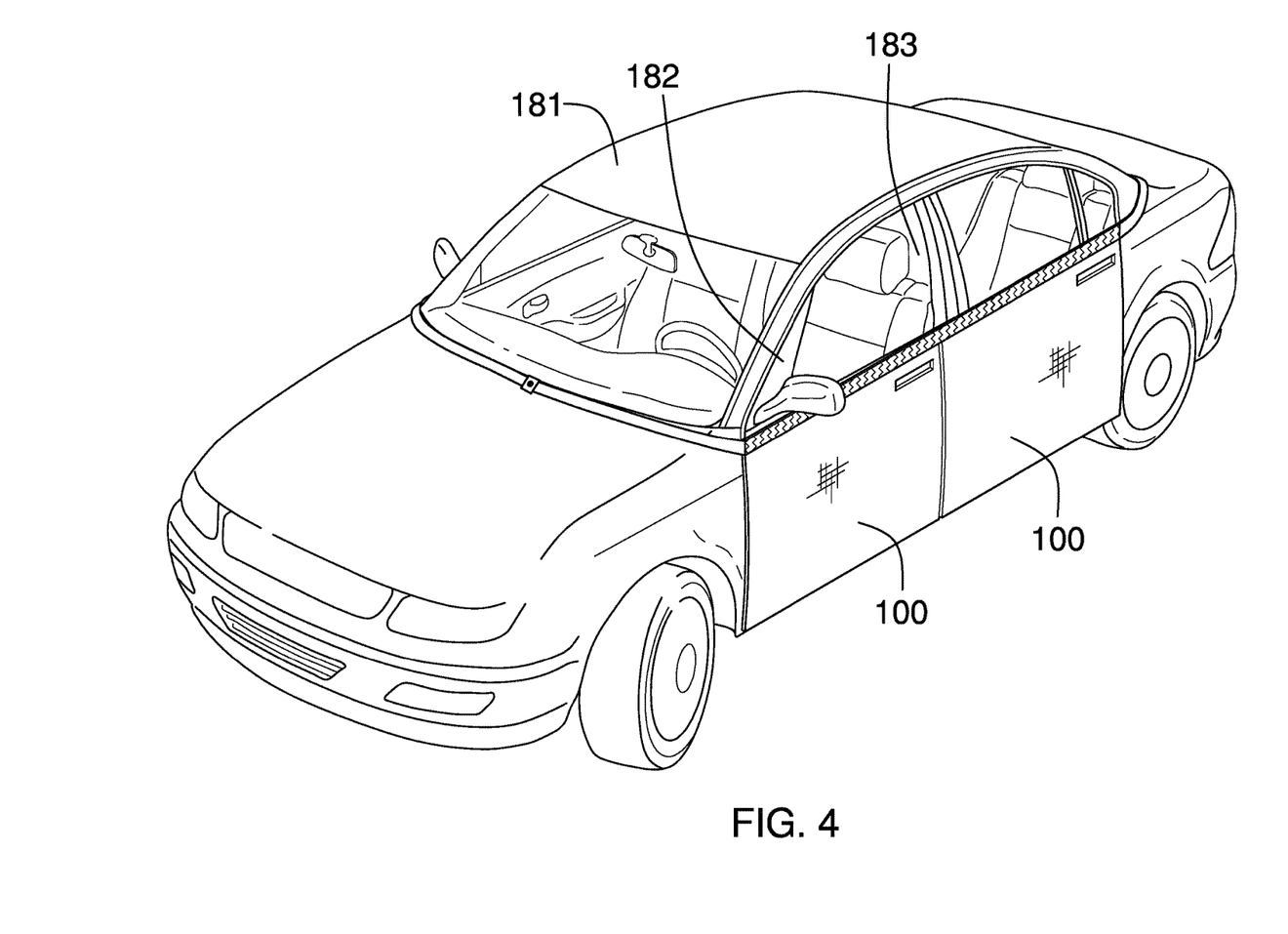
FIG. 4 is an in use view of an embodiment of the disclosure.
Figure 5:
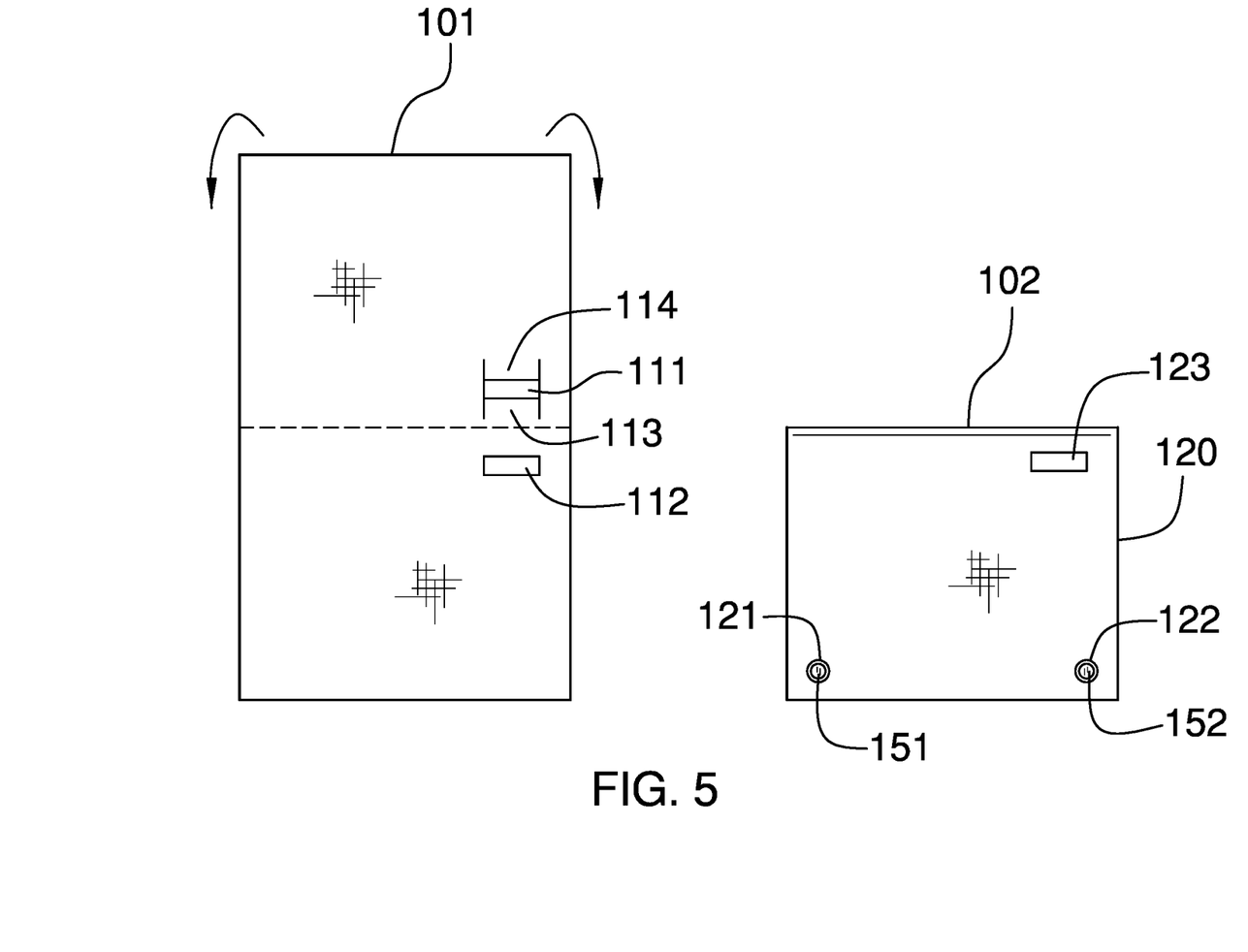
FIG. 5 is a detail view of an embodiment of the disclosure.
Figure 6:
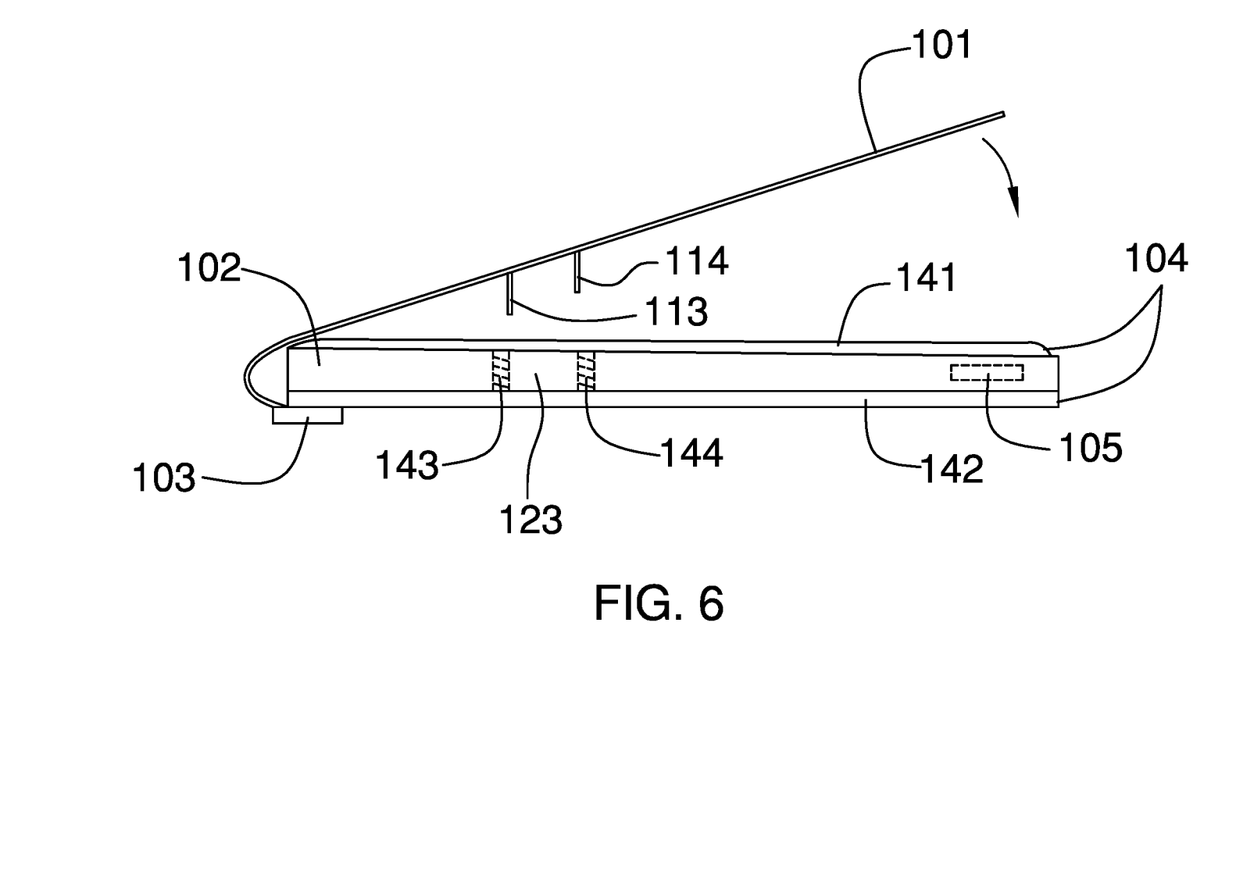
FIG. 6 is a detail view of an embodiment of the disclosure.

Detailed reference will now be made to one or more potential embodiments of the disclosure, which are illustrated in FIGS. 1 through 6.

The vehicle body protection device 100 (hereinafter invention) is configured for use with the door 182 of a vehicle 181. The door 182 is further defined with a window 183. The invention 100 forms a barrier that is removably attached to the exterior surface of the door 182. The invention 100 hangs from the window 183. The invention 100 is a composite textile that absorbs and deflects the energy from impacts that would otherwise damage the door 182 of the vehicle 181. The invention 100 comprises a cover 101, a core 102, a fastener 103, a plurality of adhesive layers 104, and a plurality of magnets 105. The plurality of magnets 105 attach to the core 102. The plurality of adhesive layers 104 attach the cover 101 to the core 102. The fastener 103 attaches the cover 101 to the window 183 of the door 182.

The cover 101 is a rectangular sheeting. In the first potential embodiment of the disclosure, the cover 101 is a textile further comprising a combination of nylon yarns and poly-para-phenylene terephthalamide (CAS 25035-37-4) yarns. The nylon yarns allow the cover 101 to be dyed a shade for decorative purposes. The poly-para-phenylene terephthalamide (CAS 25035-37-4) yarns provide the cover 101 with abrasion resistance. The cover 101 is further treated with perfluorobutanesulfonic acid (CAS 375-73-5) to provide enhanced water resistance.

The cover 101 comprises a first hand slot 111 and a second hand slot 112. The first hand slot 111 further comprises an upper flap 113 and a lower flap 114.

The first hand slot 111 is a rectangular aperture formed through the cover 101. The first hand slot 111 provides access to the handle that operates the door 182 of the vehicle 181. The first hand slot 111 is positioned such that the first hand slot 111 of the cover 101 aligns with a third hand slot 123 of the core 102 after the cover 101 is attached to the core 102. The upper flap 113 is a flap formed along an edge of the first hand slot 111. The upper flap 113 attaches to an interior surface of the third hand slot 123.

The second hand slot 112 is a rectangular aperture formed through the cover 101. The second hand slot 112 provides access to the handle that operates the door 182 of the vehicle 181. The second hand slot 112 is positioned such that the second hand slot 112 of the cover 101 aligns with the third hand slot 123 of the core 102 and the first hand slot 111 when the cover 101 is attached to the core 102. The lower flap 114 is a flap formed along the edge of the first hand slot 111 that is distal from the upper flap 113. The lower flap 114 attaches to an interior surface of the third hand slot 123.

The core 102 is a rectangular block 120 structure. The core 102 is a semi-rigid structure. The semi-rigid structure of the core 102 has a nonelastic nature. The core 102 absorbs impact energies that would potentially damage the door 182 of the vehicle 181. The core 102 comprises a rectangular block 120.

The rectangular block 120 is a sacrificial structure formed in the shape of a rectangular block 120. The rectangular block 120 is a semi-rigid structure formed from a polymer. Suitable polymers include, but are not limited to, polyethylene, polypropylene, polyvinyl chloride, or polyurethane. The rectangular block 120 comprises a first magnet cavity 121, a second magnet cavity 122, and a third hand slot 123.

The first magnet cavity 121 is a cavity formed within the rectangular block 120. The first magnet cavity 121 is sized to receive and contain the first magnet 151. The second magnet cavity 122 is a cavity formed within the rectangular block 120. The second magnet cavity 122 is sized to receive and contain the second magnet 152.

The third hand slot 123 is a rectangular aperture formed through the core 102. The third hand slot 123 provides access to the handle that operates the door 182 of the vehicle 181.

The fastener 103 is a commercially available fastening device that attaches the cover 101 and the core 102 to the door 182 of the vehicle 181. In the first potential embodiment of the disclosure, the fastener 103 is a hook and loop fastener. Hook and loop fasteners are discussed in greater detail elsewhere in this disclosure.

The fastener 103 comprises a first fastening strap 131 and a second fastening strap 132. The first fastening strap 131 is a first element of the fastener 103. The first fastening strap 131 attaches to the face of the cover 101. The second fastening strap 132 is a second element of the fastener 103. The second fastening strap 132 attaches to the face of the cover 101. The first fastening strap 131 and the second fastening strap 132 are joined to attach the cover 101 and the core 102 to the door 182.

The first fastening strap 131 further comprises a first webbing 161, a first hook/loop surface 171 and a first seam 191. The first webbing 161 is a readily and commercially available elastic webbing. The first hook/loop surface 171 is a commercially available hook/loop surface that attaches to the first webbing 161 to form the first fastening strap 131. The first seam 191 attaches the first webbing 161 to the face of the cover 101.

The second fastening strap 132 further comprises a second webbing 162, a second hook/loop surface 172 and a second seam 192. The second webbing 162 is a readily and commercially available elastic webbing. The second hook/loop surface 172 is a commercially available hook/loop surface that attaches to the second webbing 162 to form the second fastening strap 132. The second seam 192 attaches the second webbing 162 to the face of the cover 101.

Hook/loop surfaces are discussed in greater detail elsewhere in this disclosure. The first seam 191 and the second seam 192 are sew seams.

The plurality of adhesive layers 104 attach the cover 101 to the core 102. The plurality of adhesive layers 104 comprises a first adhesive layer 141, a second adhesive layer 142, a third adhesive layer 143, and a fourth adhesive layer 144.

The first adhesive layer 141 is an adhesive coating applied to a surface of the core 102. The first adhesive layer 141 attaches the cover 101 to the core 102 such that the cover 101 encloses the core 102.

The second adhesive layer 142 is an adhesive coating applied to a surface of the core 102 that is distal to the surface receiving the first adhesive layer 141. The second adhesive layer 142 attaches the cover 101 to the core 102 such that the cover 101 encloses the core 102.

The third adhesive layer 143 is an adhesive coating applied to an interior edge of the negative space formed by the third hand slot 123 of the core 102. The third adhesive layer 143 attaches the upper flap 113 of the cover 101 to the core 102.

The fourth adhesive layer 144 is an adhesive coating applied to the interior edge of the negative space formed by the third hand slot 123 of the core 102 that is distal from the location of the third adhesive layer 143. The fourth adhesive layer 144 attaches the lower flap 114 of the cover 101 to the core 102.

The plurality of magnets 105 magnetically secure the core 102 to the door 182 of the vehicle 181. The plurality of magnets 105 comprises a first magnet 151 and a second magnet 152. The first magnet 151 is a readily and commercially available magnet installed in the first magnet cavity 121 of the rectangular block 120. The first magnet 151 secures the inferior edge of the invention 100 to the door 182 of the vehicle 181. The second magnet 152 is a readily and commercially available magnet installed in the second magnet cavity 122 of the rectangular block 120. The second magnet 152 secures the inferior edge of the invention 100 to the door 182 of the vehicle 181.

To use the invention 100, the door 182 of the vehicle 181 is opened. The first fastening strap 131 and the second fastening strap 132 wrap around the window 183 of the vehicle 181. The first hook/loop surface 171 is pressed into the second hook/loop surface 172 such that the cover 101 and the core 102 cover the exterior surface of the door 182. The door 182 then closes normally.

The following definitions were used in this disclosure:

Abrasion: As used in this disclosure, abrasion refers to the rubbing of a first object against a second object in a manner that generates friction.

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cavity: As used in this disclosure, a cavity is an empty space or negative space formed within an object.

Composite Textile: As used in this disclosure, a composite textile is a multilayer fabric made of two or more joined layers of textile or sheeting materials.

Cushion: As used in this disclosure a cushion is a structure formed from a pad that is used to prevent injury or damage to a person or object.

Decorative: As used in this disclosure, decorative is an adjective that refers to a first object or item used with a second object or item of the purpose of making the second object or item more attractive. Decorative will generally, but not necessarily, implies making the second object or item more attractive visually.

Elastic: As used in this disclosure, an elastic is a material or object that deforms when a force is applied to it and that returns to its relaxed shape after the force is removed. A material that exhibits these qualities is also referred to as an elastomeric material.

Elastic Textile: As used in this disclosure, an elastic textile is a textile that contains elastic yarns as some of the yarns that make up the textile. An elastic textile is constructed such that the elastic textile will stretch when a force is applied and will return to its original shape when after the force is removed.

Elastic Webbing: As used in this disclosure, an elastic webbing is a webbing that contains elastic yarns as some of the yarns that make up the webbing. An elastic webbing is constructed such that the elastic webbing will stretch when a force is applied and will return to its original shape when after the force is removed.

Elastic Yarn: As used in this disclosure, an elastic yarn is a yarn formed from elastomeric materials.

Exterior: As used in this disclosure, the exterior is used as a relational term that implies that an object is not contained within the boundary of a structure or space.

Fastener: As used in this disclosure, a fastener is a device that is used to join or affix two objects. Fasteners generally comprise a first element, which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

Flap: As used in this disclosure, a flap is a piece of material that is otherwise attached to a surface using one side such that the piece of material rotates and hangs freely from the surface.

Handle: As used in this disclosure, a handle is an object by which a tool, object, or door is held or manipulated with the hand.

Hang: As used in this disclosure, to hang an object is to suspend an object above a surface from above such that the inferior end of the object can move freely.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Inferior: As used in this disclosure, the term inferior refers to a directional reference that is parallel to and in the same direction as the force of gravity.

Interior: As used in this disclosure, the interior is used as a relational term that implies that an object is contained within the boundary of a structure or space.

Magnet: As used in this disclosure, a magnet is an ore, alloy, or other material that has its component atoms arranged so the material exhibits properties of magnetism such as attracting other iron-containing objects or aligning itself with an external magnetic field.

Negative Space: As used in this disclosure, negative space is a method of defining an object through the use of open or empty space as the definition of the object itself, or, through the use of open or empty space to describe the boundaries of an object.

Perfluorobutanesulfonic acid: As used in this disclosure, perfluorobutanesulfonic acid (CAS 375-73-5) is a surfactant, technically a fluorosurfactant, which is commonly applied to a textile as a water repellant.

Sacrificial Structure: As used in this disclosure, a sacrificial structure is a first object or structure that protects a second object or structure from damage. More specifically, the sacrificial structure protects the second object or structure by being damaged instead of the second object or structure.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, sheeting is a material, such as a textile, a plastic, or a metal foil, in the form of a thin flexible layer or layers.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Superior: As used in this disclosure, the term superior refers to a directional reference that is parallel to and in the opposite direction of the force of gravity.

Textile: As used in this disclosure, a textile is a material that is woven, knitted, braided or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

Yarn: As used in this disclosure, a yarn is a continuous strand of textile fibers and filaments. Yarns are generally used in the production of fabrics. For the purposes of this disclosure, this definition explicitly includes yarns formed from a single filament such as a monofilament yarn.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A protective cover comprising:
    wherein the protective cover comprises a cover, a core, a fastener, a plurality of adhesive layers, and a plurality of magnets;
    wherein the plurality of magnets attach to the core;
    wherein the plurality of adhesive layers attach the cover to the core;
    wherein the protective cover is a composite textile;
    wherein the protective cover absorbs and deflects the energy from impacts;
    wherein the protective cover is configured for use with the door of a vehicle;
    wherein the protective cover forms a barrier that is removably attached to the exterior surface of the door;
    wherein the door is further defined with a window and a handle;
    wherein the fastener attaches the cover to the window of the door;
    wherein the protective cover hangs from the window;
    wherein the cover is a rectangular sheeting;
    wherein the cover comprises a first hand slot and a second hand slot;
    wherein the first hand slot is a rectangular aperture formed through the cover;
    wherein the second hand slot is a rectangular aperture formed through the cover;
    wherein the first hand slot further comprises an upper flap and a lower flap;
    wherein the upper flap is a flap formed along an edge of the first hand slot;
    wherein the lower flap is a flap formed along the edge of the first hand slot that is distal from the upper flap;
    wherein the core is a semi-rigid structure;
    wherein the semi-rigid structure of the core has a non-elastic nature;
    wherein the core comprises a rectangular block;
    wherein the rectangular block is a sacrificial structure;
    wherein the rectangular block is a semi-rigid structure;
    wherein the rectangular block comprises a first magnet cavity and a second magnet cavity;
    wherein the first magnet cavity is a cavity formed within the rectangular block;
    wherein the second magnet cavity is a cavity formed within the rectangular block;
    wherein the first magnet cavity is sized to receive and contain a magnet selected from the plurality of magnets;
    wherein the second magnet cavity is sized to receive and contain a magnet selected from the plurality of magnets;
    wherein the rectangular block further comprises a third hand slot;
    wherein the third hand slot is a rectangular aperture formed through the core;
    wherein the third hand slot is positioned to allow access to the handle of the door of the vehicle;
    wherein the first hand slot is positioned on the cover such that the first hand slot of the cover aligns with a third hand slot of the core after the cover is attached to the core;
    wherein the second hand slot is positioned on the cover such that the second hand slot of the cover aligns with the third hand slot of the core and the first hand slot when the cover is attached to the core;
    wherein the second hand slot is positioned on the cover such that the second hand slot of the cover aligns with the first hand slot when the cover is attached to the core;
    wherein the upper flap attaches to an interior surface of the third hand slot;
    wherein the lower flap attaches to an interior surface of the third hand slot.

2. The protective cover according to claim 1
    wherein the fastener comprises a first fastening strap and a second fastening strap;
    wherein the first fastening strap is a first element of the fastener;
    wherein the second fastening strap is a second element of the fastener;
    wherein the first fastening strap attaches to the face of the cover;
    wherein the second fastening strap attaches to the face of the cover.

3. The protective cover according to claim 2 wherein the first fastening strap and the second fastening strap are joined to attach the cover and the core to the window of the door.

4. The protective cover according to claim 3 wherein the fastener is a hook and loop fastener.

5. The protective cover according to claim 4 wherein
    wherein the first fastening strap further comprises a first webbing, a first hook/loop surface, and a first seam;
    wherein the second fastening strap further comprises a second webbing, a second hook/loop surface, and a second seam;
    wherein the first hook/loop surface attaches to the first webbing;
    wherein the first seam attaches the first webbing to the face of the cover;
    wherein the second hook/loop surface attaches to the second webbing;
    wherein the second seam attaches the second webbing to the face of the cover.

6. The protective cover according to claim 5 wherein
    wherein the plurality of adhesive layers comprises a first adhesive layer, a second adhesive layer, a third adhesive layer, and a fourth adhesive layer;

wherein the first adhesive layer is an adhesive coating applied to a surface of the core;

wherein the second adhesive layer is an adhesive coating applied to a surface of the core that is distal to the surface receiving the first adhesive layer;

wherein the third adhesive layer is an adhesive coating applied to an interior edge of the negative space formed by the third hand slot of the core;

wherein the fourth adhesive layer is an adhesive coating applied to the interior edge of the negative space formed by the third hand slot of the core that is distal from the location of the third adhesive layer.

7. The protective cover according to claim 6 wherein wherein the first adhesive layer attaches the cover to the core such that the cover encloses the core;

wherein the second adhesive layer attaches the cover to the core such that the cover encloses the core;

wherein the third adhesive layer attaches the upper flap of the cover to the core;

wherein the fourth adhesive layer attaches the lower flap of the cover to the core;

wherein the plurality of magnets magnetically secure the core to the door of the vehicle.

8. The protective cover according to claim 7 wherein wherein the plurality of magnets comprises a first magnet and a second magnet;

wherein the first magnet is installed in the first magnet cavity of the rectangular block;

wherein the second magnet is installed in the second magnet cavity of the rectangular block;

wherein the first magnet secures the inferior edge of the protective cover to the door of the vehicle;

wherein the second magnet secures the inferior edge of the protective cover to the door of the vehicle.

9. The protective cover according to claim 8 wherein the cover is a textile;

wherein the textile further comprises a combination of nylon yarns and poly-para-phenylene terephthalamide (CAS 25035-37-4) yarns;

wherein the cover is further treated with perfluorobutane-sulfonic acid (CAS 375-73-5).

10. The protective cover according to claim 9 wherein;

wherein the first webbing is an elastic webbing;

wherein the second webbing is an elastic webbing;

wherein the first seam and the second seam are sewn seams.

11. The protective cover according to claim 10 wherein rectangular block comprises a polymer selected from the group consisting of polyethylene, polypropylene, polyvinyl chloride, or polyurethane.

\* \* \* \* \*